(12) United States Patent
Yang et al.

(10) Patent No.: US 11,151,094 B1
(45) Date of Patent: Oct. 19, 2021

(54) CLUSTER GATEWAY TO MULTIPLE FILESYSTEMS

(71) Applicant: EMC Corporation, Hopkinton, MA (US)

(72) Inventors: Yunfeng Yang, Palo Alto, CA (US); Vijayaraghavan Srinivasaraghavan, Santa Clara, CA (US); David Reuteler, Boise, ID (US); Lei Chen, San Jose, CA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 939 days.

(21) Appl. No.: 14/671,948

(22) Filed: Mar. 27, 2015

(51) Int. Cl.
*G06F 16/182* (2019.01)
*G06F 16/11* (2019.01)
*G06F 16/176* (2019.01)

(52) U.S. Cl.
CPC .......... *G06F 16/183* (2019.01); *G06F 16/128* (2019.01); *G06F 16/1774* (2019.01)

(58) Field of Classification Search
CPC .............. G06F 17/30203; G06F 16/183; G06F 16/1774; G06F 16/128
USPC ........................................................ 707/827
See application file for complete search history.

(56) References Cited

U.S. PATENT DOCUMENTS

| | | | |
|---|---|---|---|
| 6,430,694 B1* | 8/2002 | Hosein | G06F 17/30575 707/E17.032 |
| 2006/0184931 A1* | 8/2006 | Rochette | G06F 8/61 717/169 |
| 2008/0222160 A1* | 9/2008 | MacDonald | G06F 8/61 |
| 2010/0011351 A1* | 1/2010 | Tsvi | G06F 3/0607 717/174 |
| 2013/0080559 A1* | 3/2013 | Rao | H04L 67/1097 709/208 |
| 2013/0198309 A1* | 8/2013 | Muller | G06F 9/526 709/210 |
| 2014/0047342 A1* | 2/2014 | Breternitz | G06F 9/5061 715/735 |
| 2016/0147826 A1* | 5/2016 | Mishra | G01C 21/32 707/736 |
| 2017/0017413 A1* | 1/2017 | Aston | G06F 3/0643 |

* cited by examiner

*Primary Examiner* — Alford W Kindred
*Assistant Examiner* — Allen S Lin
(74) *Attorney, Agent, or Firm* — Barry N. Young

(57) ABSTRACT

A system for a cluster gateway to multiple filesystems comprises a cluster interface, a target filesystem, a command tailor, and a filesystem interface. The cluster interface is for receiving a filesystem command from a cluster. The target filesystem determiner is for determining a target filesystem of a set of filesystems based at least in part on the filesystem command. The command tailor is for determining a tailored command of the filesystem command for the target filesystem. The filesystem interface is for providing the tailored command to the target filesystem.

13 Claims, 9 Drawing Sheets

US 11,151,094 B1

CLUSTER GATEWAY TO MULTIPLE FILESYSTEMS

BACKGROUND OF THE INVENTION

Big data clusters often comprise of hundreds to thousands of cluster machines running applications in concert. Some big data clusters are geographically distributed—for example, they comprise cluster machines in multiple locations. Geographically distributed clusters perform best on computing tasks that primarily require independent processing of large amounts of data where little communication between cluster machines is required (e.g., each cluster machine receives a data chunk, processes the data chunk according to a predetermined algorithm, and provides the result to a master cluster machine, which then assembles all of the results from different machines and provides the assembled result). Big data clusters typically store data using a data store running a single filesystem optimized for the big data operations. However, a single filesystem may not be appropriate because existing data are distributed in multiple file systems due to historical or operational reasons and/or the consolidation of the multiple file systems into a single filesystem is prohibited (e.g., prohibited due to cost of operational constraints). Having multiple filesystems presents challenges in that a consolidated view of the data for applications running on a cluster is not possible using a consistent set of interfaces. And further, the applications running on the cluster are not able to consistently schedule tasks according to location proximity and/or other desirable properties of data in filesystems.

BRIEF DESCRIPTION OF THE DRAWINGS

Various embodiments of the invention are disclosed in the following detailed description and the accompanying drawings.

DETAILED DESCRIPTION

Figure 1:
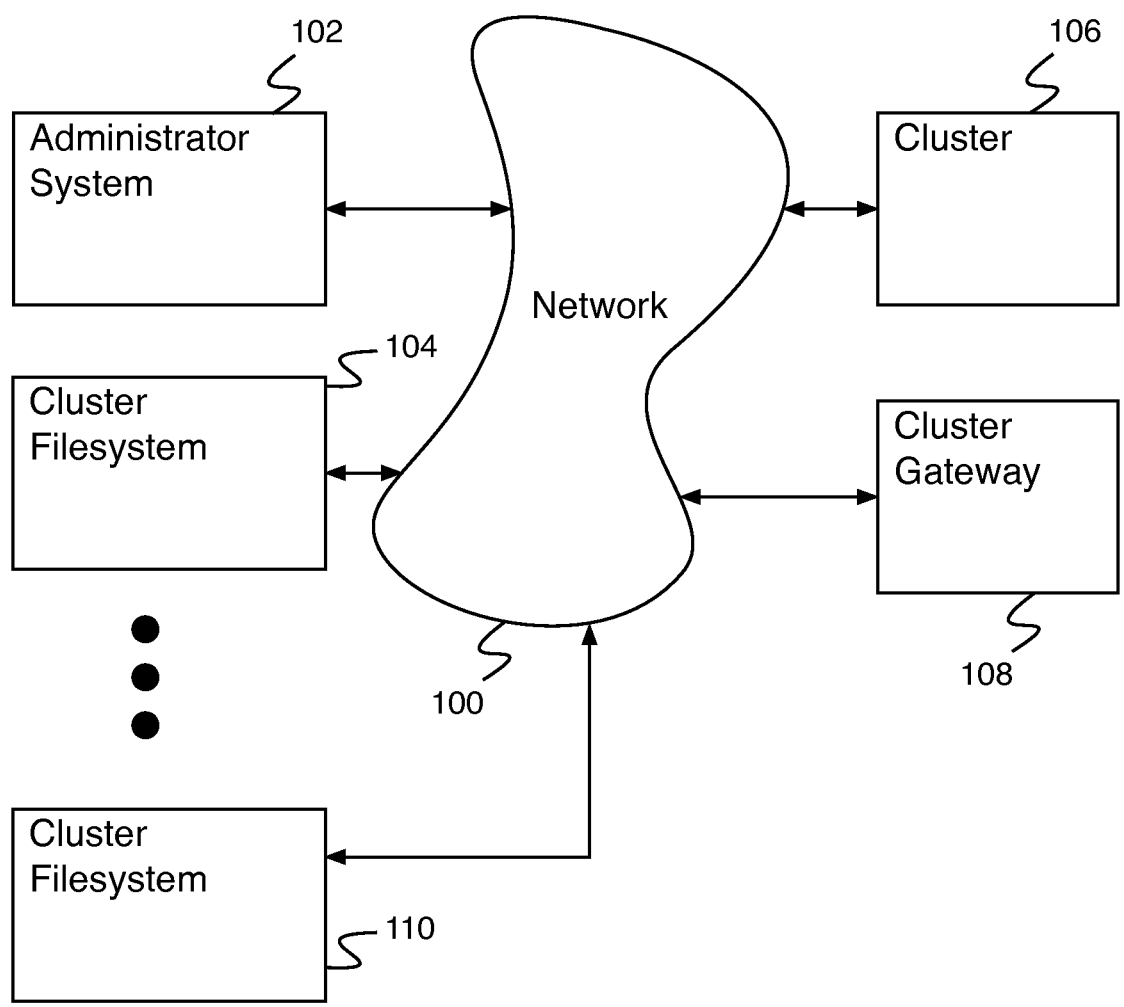
FIG. 1 is a block diagram illustrating an example of an embodiment of a network system.

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A system for a cluster gateway to multiple filesystems is disclosed. The system comprises a cluster interface for receiving a filesystem command from a cluster, a target filesystem determiner for determining a target filesystem of a set of filesystems based at least in part on the filesystem command, a command tailor for determining a tailored command of the filesystem command for the target filesystem, and a filesystem interface for providing the tailored command to the target filesystem. In some embodiments, the system comprises an information consolidator, the information consolidator is for consolidating information from multiple file systems so that the cluster appears to be receiving information from a single filesystem and/or so that information consolidator is for distributing the cluster information appropriately to one or more of the multiple file systems.

In some embodiments, the system for a cluster gateway to multiple filesystems allows a cluster to interact with multiple filesystems as though the multiple filesystems were a single filesystem. The cluster gateway comprises a cluster interface for interacting with a cluster to support a standard file system interface (e.g., a Hadoop distributed file system (HDFS) interface), where the filesystem interface is for interacting with one or more filesystems. The cluster gateway comprises a filesystem determiner for determining one or more target filesystems to receive the filesystem command. In some embodiments, the target filesystem is determined based at least in part on the path associated with the filesystem command. In some embodiments, the filesystem determiner determines that a plurality of filesystems (e.g., a subset of all the filesystems, all of the filesystems, etc.) are to receive the filesystem command. The cluster gateway comprises a command tailor for determining a tailored command. In some embodiments, the tailored command comprises a received filesystem command with a modified path. The cluster gateway comprises an information consolidator for consolidating information received from each filesystem of the plurality of filesystems (e.g., via the filesystem interface). In some embodiments, the information consolidator consolidates information so that the consolidated information appears to be received from a single filesystem. In some embodiments, the information consolidator modifies the information such as data locations from the remote cluster filesystem to allow the cluster gateway to act as a proxy for data read/wrote actions to remote cluster filesystems. The cluster gateway comprises a filesystem registry for maintaining filesystem registration information. In some embodiments, a filesystem registers with the cluster gateway in order to be recognized. In some embodiments, once a filesystem registers with the cluster gateway, the cluster can store and retrieve information on the filesystem. In some embodiments, when the filesystem registers with the cluster gateway, it indicates a path prefix to be associated with the filesystem in the cluster gateway. When the cluster gateway interacts with the cluster, data stored in the filesystem appears to the cluster with its path prefixed by the associated path prefix.

In some embodiments, when a filesystem command is received from a cluster by the cluster gateway (e.g., by the cluster interface of the cluster gateway), the filesystem command is tailored by the command tailor to provide the tailored command to a filesystem determined by the filesystem determiner. In some embodiments, tailoring the filesystem command comprises determining the path associated with the filesystem command, parsing the path into a filesystem path (e.g., a path associated with pointing to a target filesystem) and a local path (e.g., a path within the target filesystem path pointing to the file stored on the target filesystem), and providing the local path name to the target filesystem to access the file associated with the filesystem command. In some embodiments, determining a filesystem to provide the tailored command comprises determining the path associated with the filesystem command, parsing the path into a filesystem path (e.g., a path associated with pointing to a target filesystem) and a local path (e.g., a path within the target filesystem path pointing to the file stored in the target filesystem), and determining the filesystem associated with the filesystem path. In some embodiments, determining the filesystem associated with the filesystem path comprises querying a filesystem registry.

FIG. 1 is a block diagram illustrating an example of an embodiment of a network system. In some embodiments, the network system of FIG. 1 comprises a system for a cluster gateway to multiple filesystems. In the example shown, administrator system 102, multiple cluster filesystems (e.g., cluster filesystem 104 and cluster filesystem 110, etc.), cluster 106, and cluster gateway 108 communicate with one another via network 100. In various embodiments, network 100 comprises one or more of the following: a local area network, a wide area network, a wired network, a wireless network, the Internet, an intranet, a storage area network, or any other appropriate communication network. In various embodiments, administrator system 102, the multiple cluster filesystems, cluster 106, and cluster gateway 108 and subsets thereof are in physical proximity to one another (e.g., in the same building, in the same room, etc.) or are physically remote from one another (e.g., in separate buildings of a campus, in separate locations of a business, at separate offices of a collaboration between organizations, in separate countries, etc.). In various embodiments, the processors of administrator system 102, cluster filesystems, cluster 106, and cluster gateway 108 comprise any one of a variety of proprietary or commercially available single or multi-processor systems (e.g., an Intel-based processor) or other type of commercially available processor able to support communications in accordance with each particular embodiment and application.

In some embodiments, cluster 106 comprises a plurality of cluster computing devices. In various embodiments, a computer cluster comprises 4, 32, 193, 1024, 5000, or any other appropriate number of cluster computing devices. In various embodiments, the cluster computing devices of a computer cluster are located in a single location (e.g., in a single room), the cluster computing devices of a computer cluster are located in geographically remote groups (e.g., groups of any appropriate number of cluster computing devices located in a single location, wherein the groups are geographically remote from one another), the cluster computing devices of a computer cluster are geographically remote from one another, or the cluster computing devices of a computer cluster are geographically distributed in any other appropriate way. In some embodiments, the cluster computing devices of a cluster work together to execute a cluster computing job (e.g., a data analysis job, a software application job, a business computation job, a scientific computation job, etc.). Administrator system 102 comprises a system accessed by an administrator for administrating the network system of FIG. 1 or subsets of the network system of FIG. 1. In some embodiments, administrator system 102 comprises a system for executing jobs on a computer cluster. Cluster filesystems (e.g., cluster filesystem 104 or cluster filesystem 110) are used in the process of storing or recalling stored data. In various embodiments, there are 1, 2, 3, 5, 10, 11, or any other appropriate number of cluster filesystems. In some embodiments, a location associated with a cluster computing device (e.g., cluster computing device of cluster 106) is associated with a specific cluster filesystem (e.g., cluster filesystem 104). In some embodiments, each cluster computing device can communicate with any cluster filesystem. In some embodiments, a cluster computing device communicates with a cluster filesystem located proximally to it faster than a cluster computing device located remotely. In some embodiments, the network system comprises a single cluster filesystem and all cluster computing devices communicate with the single cluster filesystem. In some embodiments, cluster computing device 106 is configured to communicate with only a single cluster filesystem. Cluster gateway 108 comprises a cluster gateway for allowing a cluster computing device to communicate with a plurality of cluster filesystems. In some embodiments, cluster gateway 108 appears to cluster 106 as a cluster filesystem (e.g., cluster gateway 108 indicates to cluster 106 that it is a cluster filesystem; cluster gateway 108 is capable of responding to all commands that a cluster filesystem responds to, etc.). In some embodiments, cluster gateway 108 communicates with a plurality of cluster filesystems. In some embodiments, cluster gateway 108 presents information received from a plurality of cluster filesystems to a cluster as though the information were stored on a single cluster filesystem. In some embodiments, the network system comprises a single cluster gateway. In embodiments, the network system comprises a plurality of cluster gateways.

Figure 2:
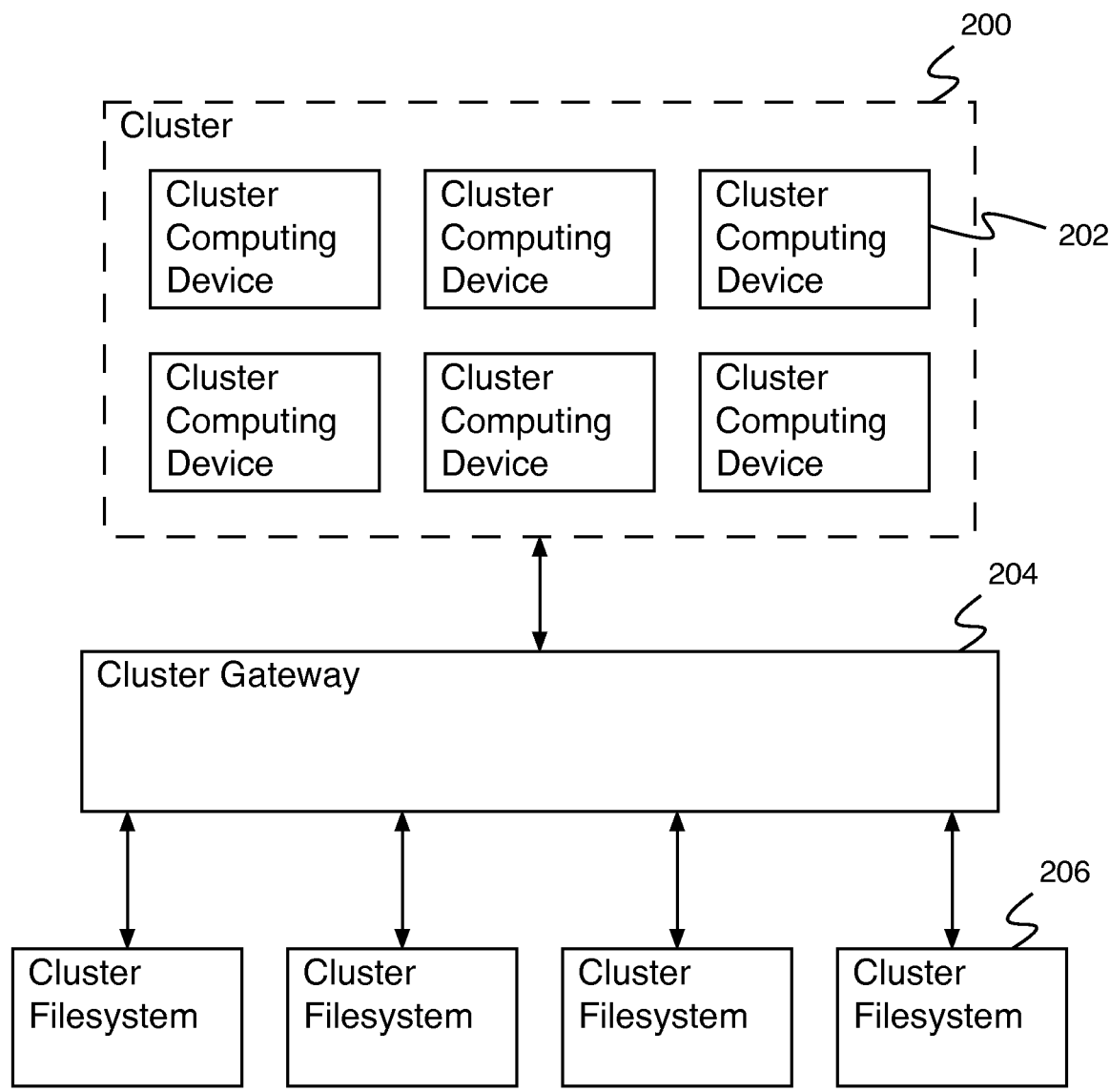
FIG. 2 is a block diagram illustrating an example of an embodiment of cluster communications.

FIG. 2 is a block diagram illustrating an example of an embodiment of cluster communications. In some embodiments, the systems of FIG. 2 comprise systems as shown in FIG. 1 (e.g., cluster 200 comprises cluster 106 of FIG. 1; cluster gateway 204 comprises cluster gateway 108 of FIG. 1; cluster filesystem 206 comprises cluster filesystem 104 of FIG. 1). In some embodiments, communications of FIG. 2 are via a network (e.g., network 100 of FIG. 1). In the example shown, cluster 200 comprises a plurality of cluster computing devices (e.g., cluster computing device 202). Cluster computing devices of cluster 200 communicate with a plurality of cluster filesystems (e.g., cluster filesystem 206) via cluster gateway 204. In some embodiments, cluster computing devices of cluster 200 are configured to communicate with only a single cluster filesystem. In some embodiments, cluster gateway 204 communicates with the plurality of cluster filesystems and presents information from the plurality of cluster filesystems to the cluster as though the information came from only a single cluster filesystem. In some embodiments, the cluster computing devices of cluster 200 are located in different locations. In some embodiments, the cluster filesystems are located in corresponding locations of the cluster computing devices of cluster 200. In some embodiments, all communications between cluster computing devices and cluster filesystems pass through cluster gateway 204. In some embodiments, some communications between cluster computing devices and cluster filesystems pass through cluster gateway 204 (e.g., filesystem commands, control commands, etc.) and some communications between cluster computing devices and cluster filesystems are routed directly (e.g., data reading and writing).

Figure 3:
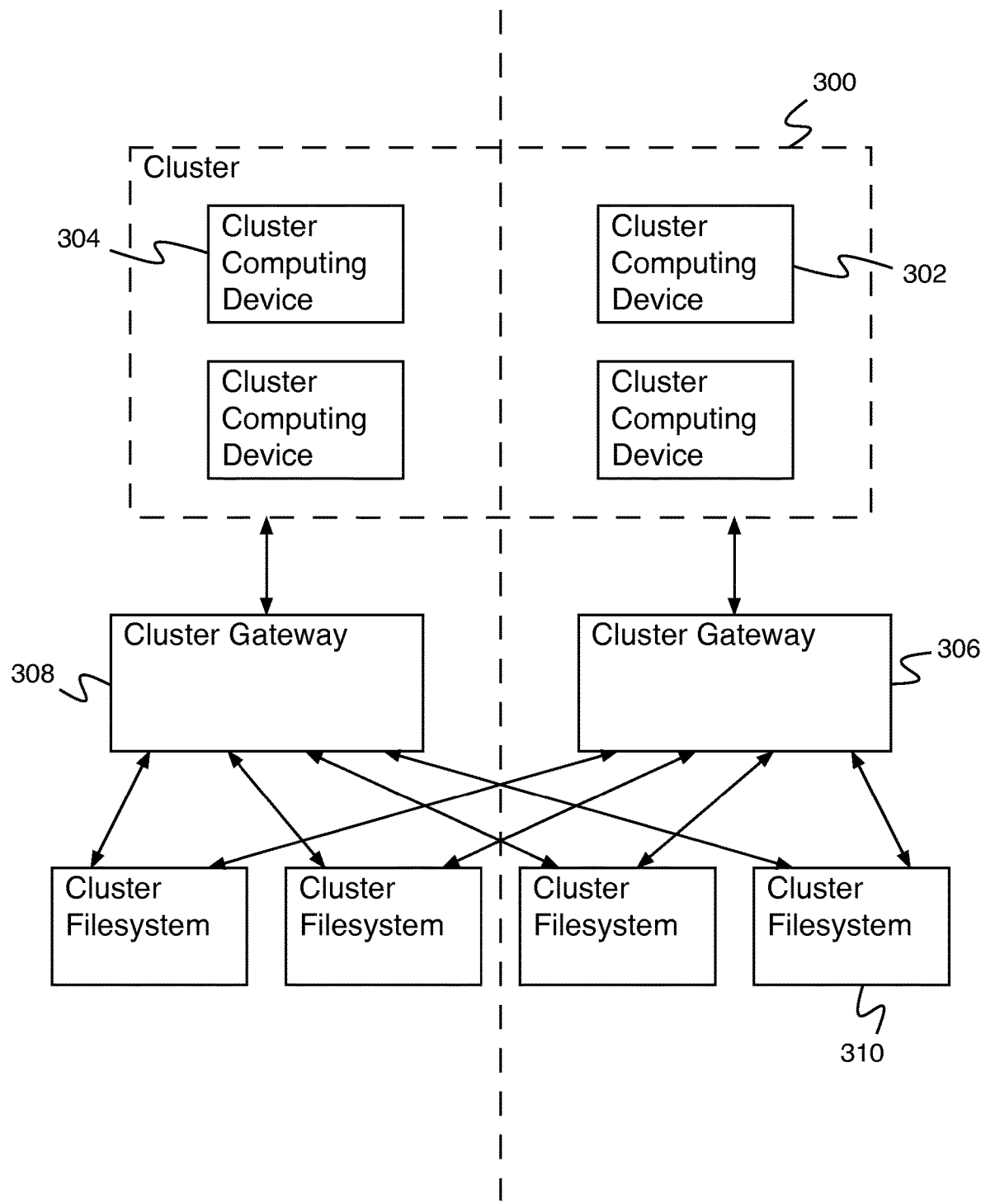
FIG. 3 is a block diagram illustrating an example of an embodiment of cluster communications.

FIG. 3 is a block diagram illustrating an example of an embodiment of cluster communications. In some embodiments, the systems of FIG. 3 comprise systems as shown in FIG. 1 (e.g., cluster 300 comprise cluster 106 of FIG. 1; cluster gateway 306 or cluster gateway 308 comprise a cluster gateway as in cluster gateway 108 of FIG. 1; cluster filesystem 310 comprises cluster filesystem 104 of FIG. 1). In the example shown, the systems of FIG. 3 are divided into two localities (e.g., systems on the left side of FIG. 3 are located in a first location and systems on the right side of FIG. 3 are located in a second location). In the example shown, devices of cluster 300 are capable of communicating with cluster gateway 306 and cluster gateway 308. In some embodiments, cluster computing devices located in a first location (e.g., cluster computing device 304) are configured to communicate with a cluster gateway located in the first location (e.g. cluster gateway 308), and cluster computing devices located in the second location (e.g., cluster computing device 302) are configured to communicate with a cluster gateway located in the second location (e.g. cluster gateway 306). In the example shown, each cluster gateway is configured to communicate with each cluster filesystem, providing access to each cluster filesystem for each cluster computing device. In some embodiments, the system of FIG. 3 is designed such that a cluster computing device interacts with stored data on a cluster filesystem in proximity to it and is accessible via a cluster gateway in proximity to it in order reduce communication time. In some embodiments, all communications between cluster computing devices and cluster filesystems pass through cluster gateways.

Figure 4:
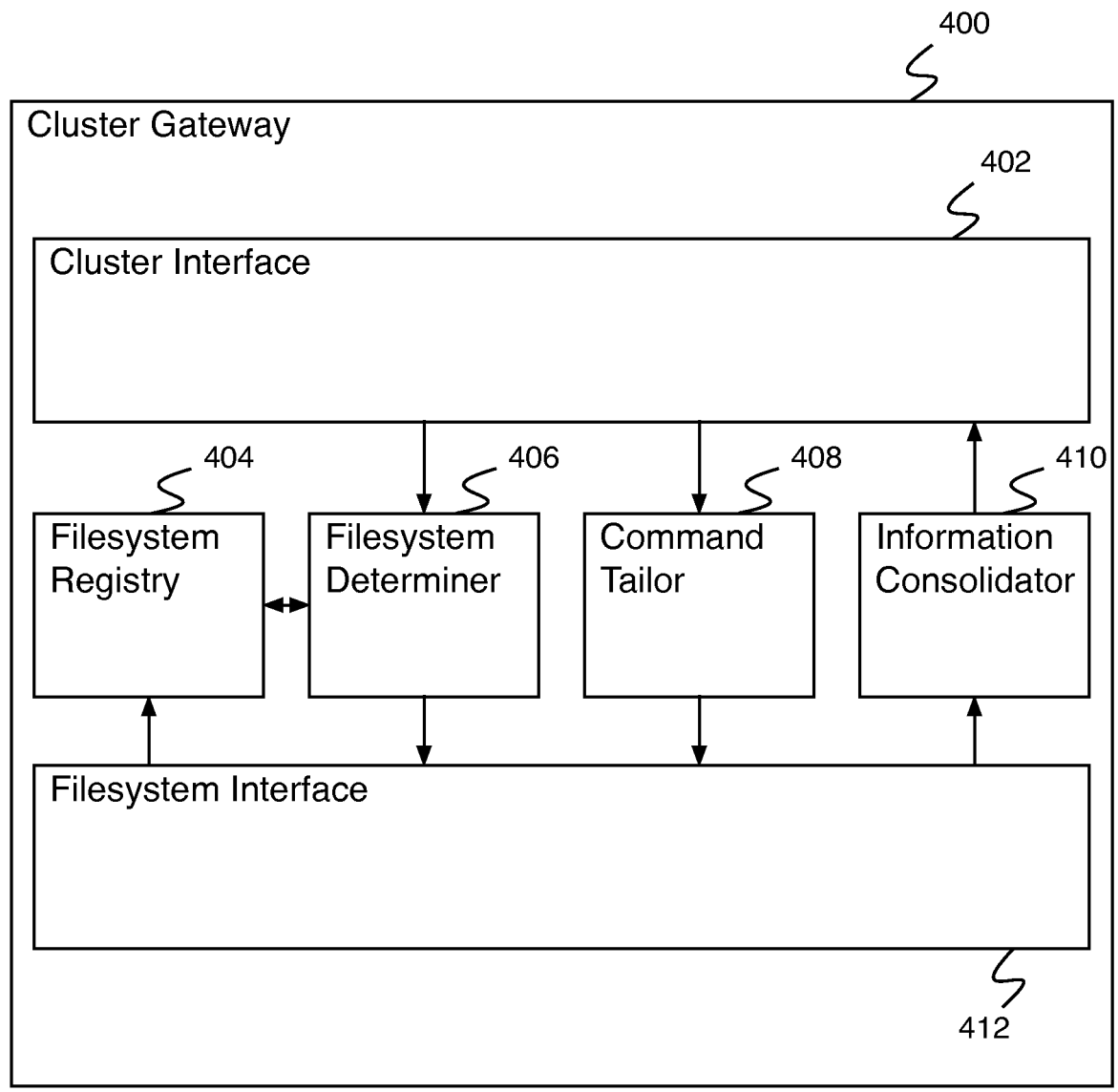
FIG. 4 is a block diagram illustrating an example of an embodiment of a cluster gateway.

FIG. 4 is a block diagram illustrating an example of an embodiment of a cluster gateway. In some embodiments, cluster gateway 400 comprises cluster gateway 108 of FIG. 1. In the example shown, cluster gateway 400 comprises cluster interface 402. In various embodiments, cluster interface 402 comprises a cluster interface for receiving a command from a cluster, for providing information to a cluster, for providing consolidated information to a cluster or for communicating in any other appropriate information to or from a cluster. Cluster gateway 400 additionally comprises filesystem determiner 406. In some embodiments, filesystem determiner 406 comprises a filesystem determiner for determining a filesystem from a filesystem command (e.g., a filesystem command received by cluster interface 402). In some embodiments, filesystem determiner 406 comprises a filesystem determiner for determining which of a plurality of filesystems to communicate a command. In some embodiments, filesystem determiner 406 comprises a filesystem determiner for determining which of a plurality of filesystems to communicate a tailored command. Cluster gateway 400 additionally comprises filesystem registry 404. In some embodiments, filesystem registry 404 comprises a list of filesystems that have registered with cluster gateway 400. In some embodiments, filesystem registry 404 stores a filesystem path associated with each registered filesystem. In some embodiments, filesystem determiner 406 communicates with filesystem registry 404 when determining a filesystem. Cluster gateway 400 additionally comprises command tailor 408. In some embodiments, command tailor 408 comprises a command tailorer for receiving a filesystem command (e.g., a filesystem command received via cluster interface 402) and determining a tailored command. In some embodiments, a tailored command comprises the received filesystem command including a modified path. Cluster gateway 400 additionally comprises filesystem interface 412. In some embodiments, filesystem interface 412 comprises an interface for communicating with one or more filesystems. In some embodiments, filesystem interface 412 comprises an interface for providing a tailored command to a filesystem. In some embodiments, filesystem interface 412 comprises an interface for receiving information from a filesystem. In some embodiments, filesystem interface 412 comprises an interface for receiving information from a plurality of filesystems. Cluster gateway 400 additionally comprises information consolidator 410 for consolidating information received via filesystem interface 412. In some embodiments, information consolidator 410 consolidates information received from a plurality of filesystems to appear as though it was received from a single filesystem. In some embodiments, consolidated information is provided to a cluster via cluster interface 402.

Figure 5:
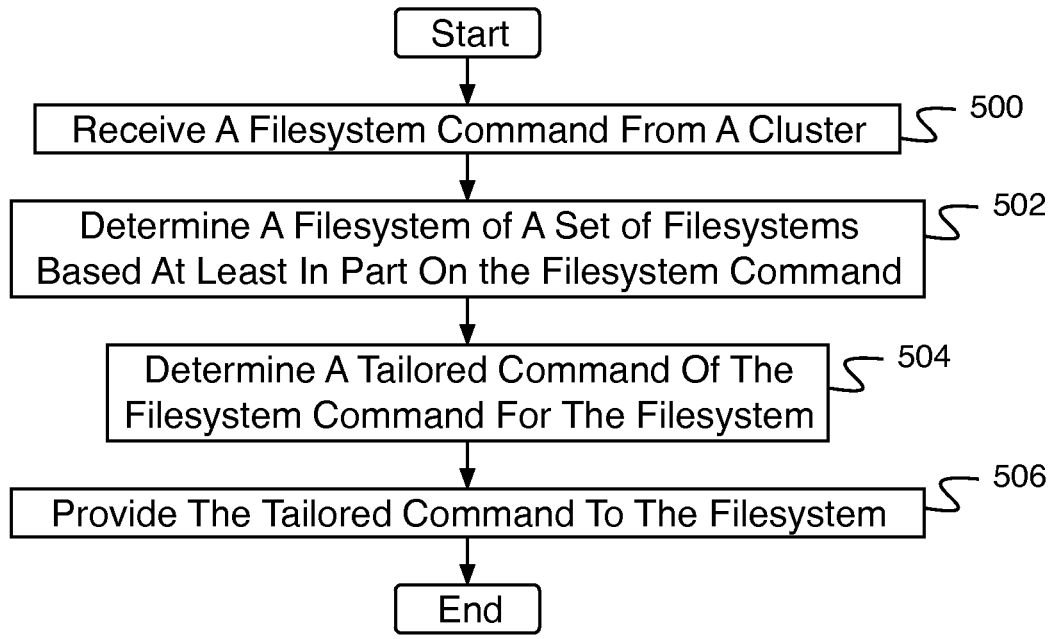
FIG. 5 is a flow diagram illustrating an example of an embodiment of a process for a cluster gateway to multiple filesystems.

FIG. 5 is a flow diagram illustrating an example of an embodiment of a process for a cluster gateway to multiple filesystems. In some embodiments, the process of FIG. 5 is executed by cluster gateway 400 of FIG. 4. In the example shown, in operation 500, a filesystem command is received from a cluster. For example, the filesystem command is received from a cluster computing device of a cluster, where the filesystem command includes accessing a filesystem of a plurality of filesystems. In operation 502, a filesystem of a set of filesystems is determined based at least in part on the filesystem command. For example, one or more filesystems are determined as the appropriate receiver(s) of the filesystem command (e.g., a list directory operation might be for a top level directory which includes information from directories of many filesystems or from only one filesystem). In operation 504, a tailored command of the filesystem command is determined for the filesystem. For example, the tailored filesystem is tailored for the appropriate receiving filesystem(s)—for example, the tailored command includes a modified path (e.g., each path appropriate for its target filesystem), a changed command (e.g., appropriate for the target filesystem), etc. In operation 506, the tailored command is provided to the filesystem. For example, the filesystem command is provided to the target filesystem.

In some embodiments, a filesystem command comprises an action. In various embodiments, an action comprises, a read action, a write action, a move action, a copy action, a delete action, a get info action, a list action, a change permissions action, a list permissions action, a directory creation action, or any other appropriate command. In some embodiments, a filesystem command comprises a path. In some embodiments, a path comprises a filesystem path (e.g., a path indicating a filesystem of a plurality of filesystems— for example, /filesystemA/ . . . ). In some embodiments, a path comprises a local path (e.g., a path indicating a path within a filesystem of a plurality of filesystems—for example, . . . /local_directoryB/ . . . ). In some embodiments, a filesystem command comprises a filename (e.g., file_nameC with path /filesystemA/local_directoryB/file_nameC which is then tailored to /local_directoryB/file_nameC that is provided to the filesystem associated with the name filesystemA). In some embodiments, a tailored command includes adding appropriate path modifiers to a command path name (e.g., /root_directoryD/ . . . to /local_directoryB/file_nameC).

In some embodiments, the tailored path names for the filesystems are determined using an index that maps input path name components (e.g., virtual single filesystem path names) to output actual filesystem names (e.g., a specific path to one of multiple filesystems). In some embodiments, each file name in the virtual single filesystem corresponds to a specific path on a specific filesystem in the index. In some embodiments, the index is stored on a cluster gateway. In some embodiments, the cluster gateway tailors path names by mapping directory tree names to filesystems and storing a mapping for directory tree names form the virtual single filesystem to the specific filesystem of the multiple filesystems.

In some embodiments, a cluster gateway receives an action (e.g., a "list" action) with a given path. A tailored action (e.g., a tailored "list" action) for each filesystem is generated. In some embodiments, the given path comprises a prefix of the given path. In some embodiments, the prefix comprises a destination mapping of a registered filesystem. For example, a tailored action is generated for and delivered to each filesystem, as appropriate, such as <tailored command> <tailored path>, where the tailored command comprises a customized for that the filesystem (e.g., using a mapping between the input command and the filesystem's command) and the tailored path comprises a customized path (e.g., mapping an input path name from the cluster to a filesystem pathway using a database or generating a filesystem pathway using a database for each of the filesystems in a situation where no path is input).

In some embodiments, a cluster gateway receives a "get data block location" action from an application. In some embodiments, the application is identifying the proximity of the data block in order to appropriately schedule tasks by the application. In some embodiments, the proximity is determined based at least in part by providing a filesystem location associated with the data block which is determined using a registry that maps the "unified" filesystem path name to an "actual" filesystem and pathname in the "actual" filesystem. In some embodiments, a tailored command is generated for the input command by replacing the path (e.g., use the path prefix of the input command to generate a tailored path—for example, using a mapping or a registry or database) and by tailoring the command (e.g., use the input command and mapping it to a filesystem command path—for example, using a mapping or a registry or database). The tailored command is delivered or dispatched to the corresponding to the appropriate file system. The response (e.g., the data block location) from the appropriate data node is received by the gateway and stored along with a "unified" filesystem address, which is then provided to the cluster in order that the cluster is able to later access the data block (e.g., via the cluster gateway).

In some embodiments, when a response is received from one of the multiple file systems, the cluster gateway determines that the cluster (e.g., a node in the cluster) does not have direct access to a data node hosting a target data block. The cluster gateway acts as a proxy when the cluster accesses data on the data nodes. The gateway receives access requests from the cluster for the data and provides the data node with these requests by determining the appropriate block location based on information cached on the gateway (e.g., a mapping of data locations in multiple filesystems to a "unified" filesystem to present to the cluster). The gateway also receives the response of the data node and provides it to the requestor (e.g., the cluster, a node of the cluster, etc.).

Figure 6:
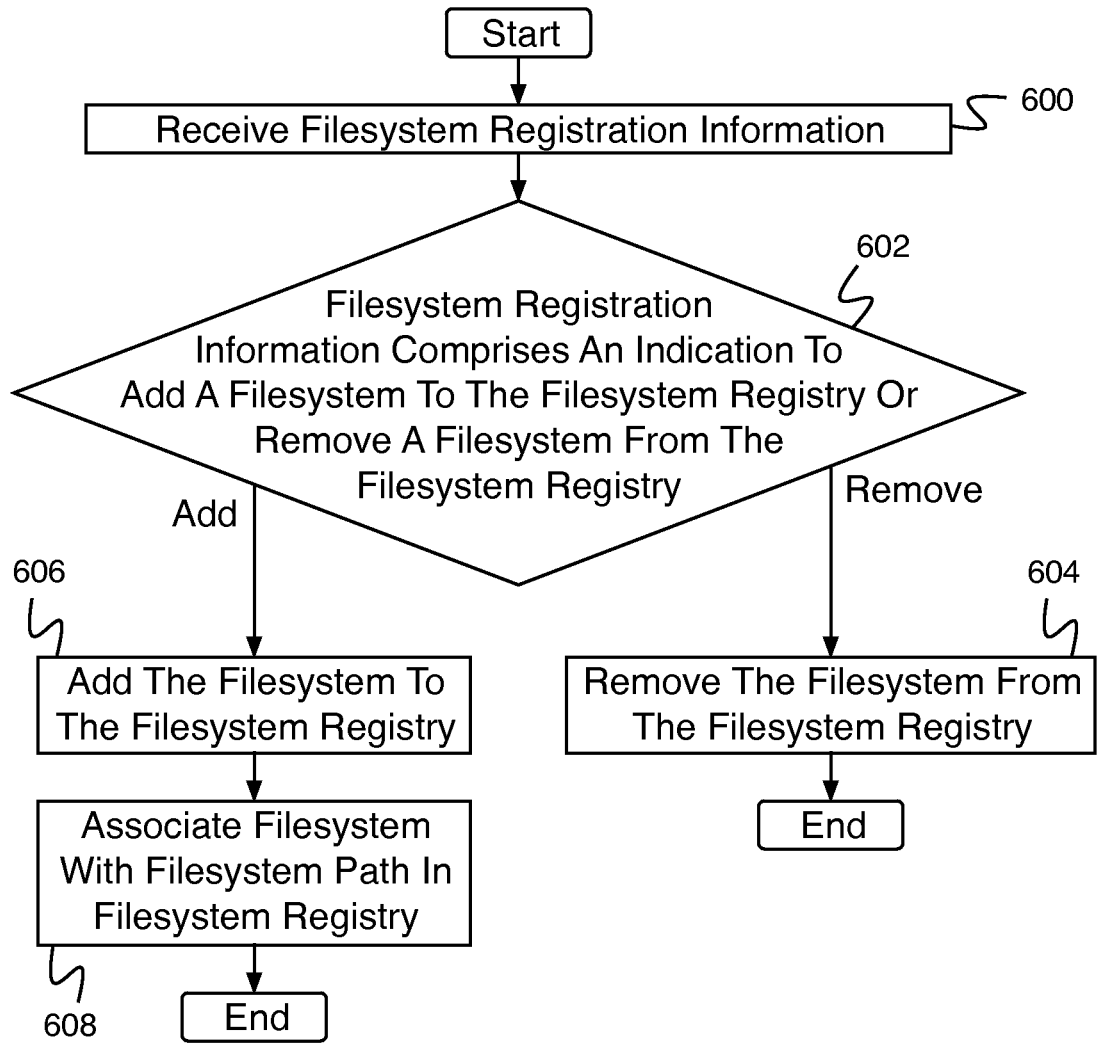
FIG. 6 is a flow diagram illustrating an example of an embodiment of a process for registering a filesystem with a cluster gateway to multiple filesystems.

FIG. 6 is a flow diagram illustrating an example of an embodiment of a process for registering a filesystem with a cluster gateway to multiple filesystems. In some embodiments, the process of FIG. 6 is performed by a filesystem registry (e.g., filesystem registry 404 of FIG. 4). In the example shown, in operation 600, filesystem registration information is received. In various embodiments, filesystem registration information comprises a filesystem name, a filesystem internet protocol address, filesystem authentication information, a filesystem shared path (e.g., a path within the registering filesystem that is to be shared), a filesystem associated path (e.g., a path prefix indicating the path within the cluster gateway where the filesystem is indicated to be mounted), a filesystem registration command (e.g., add the filesystem to the registry, remove the filesystem from the registry, etc.) or any other appropriate filesystem information. In operation 602, it is determined whether the filesystem registration information comprises an indication to add a filesystem to the filesystem registry or remove a filesystem from the filesystem registry. In the event it is determined that the filesystem registration information comprises an indication to remove the filesystem from the filesystem registry, control passes to operation 604. In operation 604, the filesystem is removed from the filesystem registry, and the process ends. In the event it is determined in operation 602 that the filesystem registration information comprises an indication to add a filesystem to the filesystem registry, control passes to operation 606. In operation 606, the filesystem is added to the filesystem registry. In operation 608, the filesystem is associated with a filesystem path (e.g., a filesystem associated path) in the filesystem registry. For example, the filesystem path corresponding the to the single virtual filesystem is stored associated with the actual path to a specific filesystem (e.g., an index enabling a command tailor to translate between the single filesystem and the actual filesystems).

Figure 7:
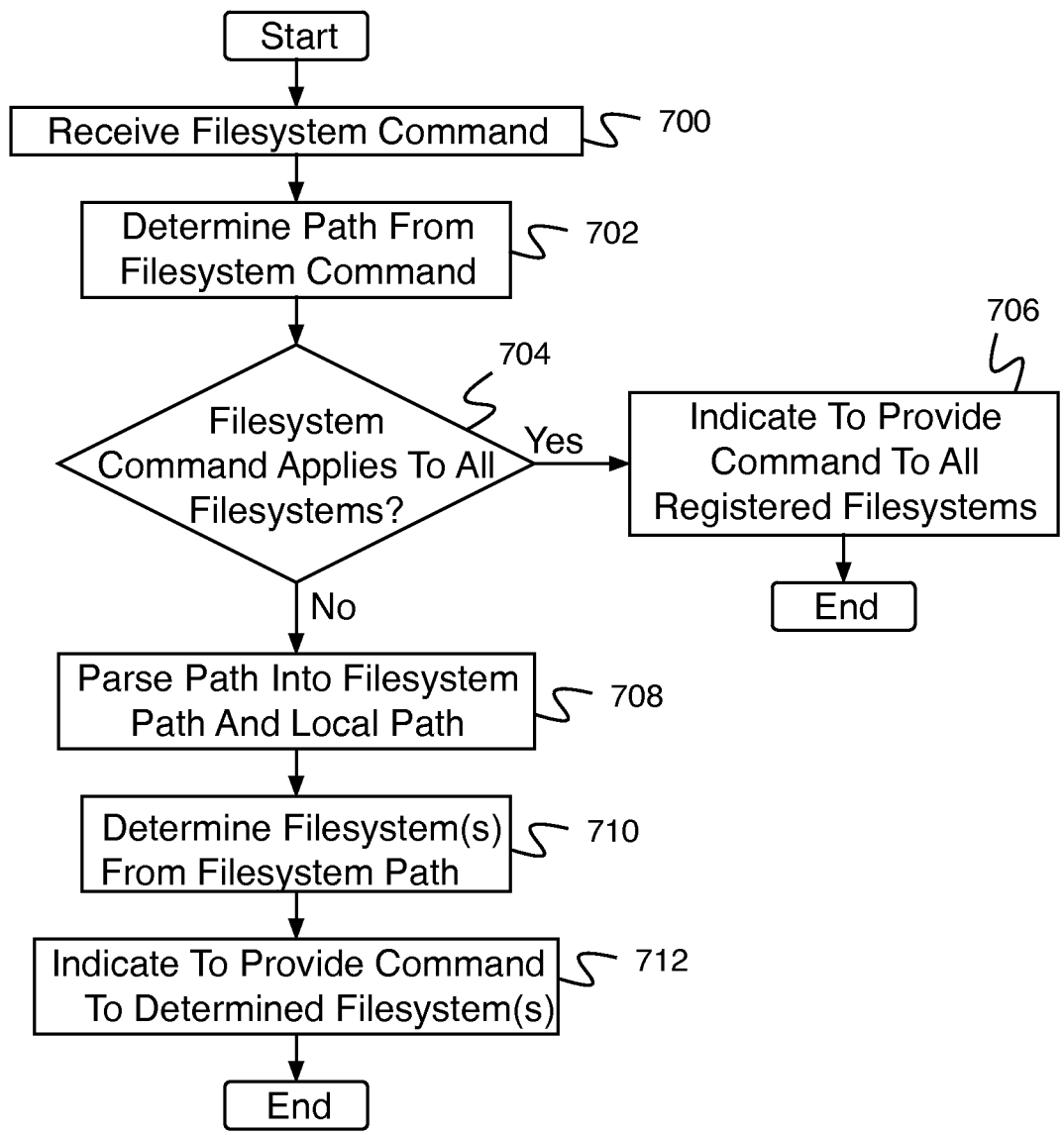
FIG. 7 is a flow diagram illustrating an example of an embodiment of a process for determining a filesystem of a set of filesystems based at least in part on a filesystem command.

FIG. 7 is a flow diagram illustrating an example of an embodiment of a process for determining a filesystem of a set of filesystems based at least in part on a filesystem command. In some embodiments, the process of FIG. 7 implements operation 502 of FIG. 5. In the example shown, in operation 700, a filesystem command is received. For example, a command accessing data on a filesystem (e.g., read a data file, list a directory, etc.). In operation 702, a path is determined from the filesystem command. In some embodiments, a filesystem command received from cluster includes a path for indicating the location with the cluster gateway to perform the desired action. In some embodiments, the filesystem command does not include a path. In some embodiments, the filesystem command includes an implied path (e.g., an explicit path is not included as part of the filesystem command but a path is implied by the context of the filesystem command). In operation 704, it is determined whether the filesystem command applies to all filesystems (e.g., all filesystem registered to the cluster gateway). In some embodiments, it is determined that the filesystem command applies to all filesystems in the event that the command does not include a path (e.g., explicit or implied). In some embodiments, it is determined that the filesystem command applies to all filesystems in the event that the command includes a path that applies to all filesystems (e.g., a root path, a path including the paths to all filesystems, etc.). In the event it is determined that the filesystem command applies to all filesystems, control passes to operation 706. In operation 706, it is indicated (e.g., to a filesystem interface) to provide the command (e.g., the command determined by a command tailor) to all registered filesystems, and the process ends. For example, all filesystems receive the command (e.g., dir*). In some embodiments, all filesystems are indicated to receive the command by including all filesystems registered in the registry of filesystems. In the event it is determined that the filesystem command does not apply to all filesystems, control passes to operation 708. In operation 708, the path is parsed into a filesystem path and a local path. For example, the path name associated with the filesystem command is used to determine one or more filesystems that are to receive the filesystem command (e.g., a directory listing command includes a number of subdirectories each on different filesystems so that each of the appropriate different files systems receives a tailored version of the filesystem command). In some embodiments, a filesystem path comprises a path prefix for identifying a filesystem of a set of filesystems. In some embodiments, the path is parsed into a filesystem path and a local path by comparing the leading part of the path with all known path prefixes (e.g., path prefixes stored in a filesystem registry) until one of the path prefixes is found to match and is determined to be the filesystem path. In some embodiments, the path is parsed into a filesystem path and a local path by determining the filesystem path to be the lowest level directory indicated within the path. In operation 710, filesystem(s) is/are determined from the filesystem path. For example, one or more filesystems are determined to receive the command. In some embodiments, a filesystem is determined from the filesystem path by querying the filesystem registry. In operation 712, it is indicated to provide a command (e.g., a command determined by a command tailor) to the determined filesystem(s).

Figure 8:
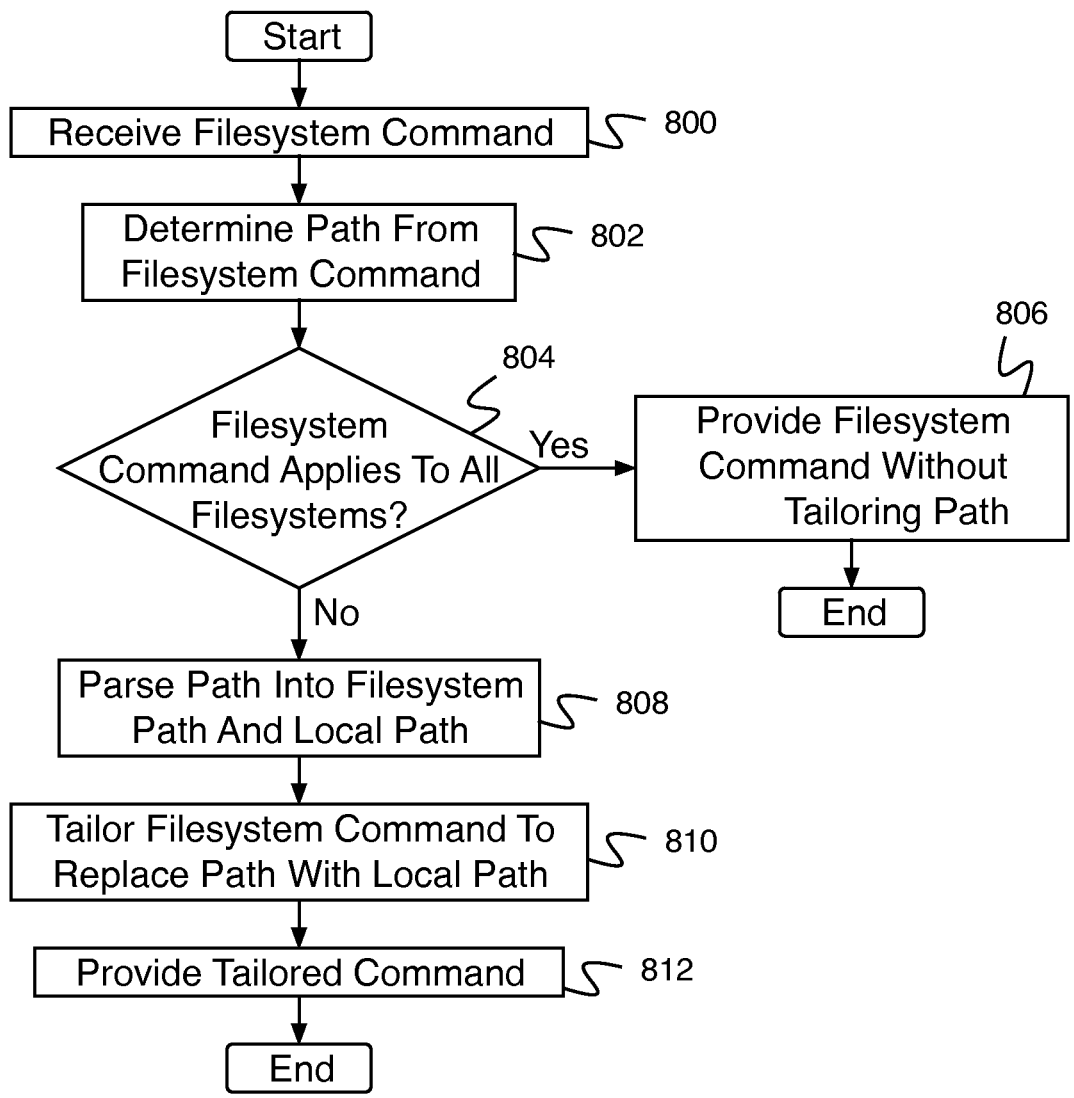
FIG. 8 is a flow diagram illustrating an example of an embodiment of a process for determining a tailored command based at least in part on a filesystem command.

FIG. 8 is a flow diagram illustrating an example of an embodiment of a process for determining a tailored command based at least in part on a filesystem command. In some embodiments, the process of FIG. 8 implements operation 504 of FIG. 5. In the example shown, in operation 800, a filesystem command is received. In operation 802, a path is determined from the filesystem command. In some embodiments, a filesystem command received from cluster includes a path for indicating the location with the cluster gateway to perform the desired action. In some embodiments, the filesystem command does not include a path. In some embodiments, the filesystem command includes an implied path (e.g., an explicit path is not included as part of the filesystem command but a path is implied by the context of the filesystem command). In operation 804, it is determined whether the filesystem command applies to all filesystems (e.g., all filesystem registered to the cluster gateway). In some embodiments, it is determined that the filesystem command applies to all filesystems in the event that the command does not include a path (e.g., explicit or implied). In some embodiments, it is determined that the filesystem command applies to all filesystems in the event that the command includes a path that applies to all filesystems (e.g., a root path, a path including the paths to all filesystems, etc.). In the event it is determined that the filesystem command applies to all filesystems, control passes to operation 806. In operation 806, the filesystem command is provided without tailoring a path, and the process ends. For example, the filesystem command is provided to all filesystems and includes a wild card (e.g., dir*). In some embodiments, the command is provided to all filesystems and the command is tailored for each filesystem (e.g., the path or the command is tailored for the specific filesystem—for example, different filesystems require different command syntax or wild cards or path names). In the event it is determined that the filesystem command does not apply to all filesystems, control passes to operation 808. In operation 808, the path is parsed into a filesystem path and a local path. In some embodiments, a filesystem path comprises a path prefix for identifying a filesystem of a set of filesystems. In some embodiments, the path is parsed into a filesystem path and a local path by comparing the leading part of the path with all known path prefixes (e.g., path prefixes stored in a filesystem registry) until one of the path prefixes is found to match and is determined to be the filesystem path. In some embodiments, the path is parsed into a filesystem path and a local path by determining the filesystem path to be the lowest level directory indicated within the path. In operation 810, the filesystem command is tailored to replace the path with the local path. In some embodiments, the filesystem command is tailored for the specific filesystem (e.g., syntax, command, wild cards, order, etc.). In operation 812, the tailored command is provided.

Figure 9:
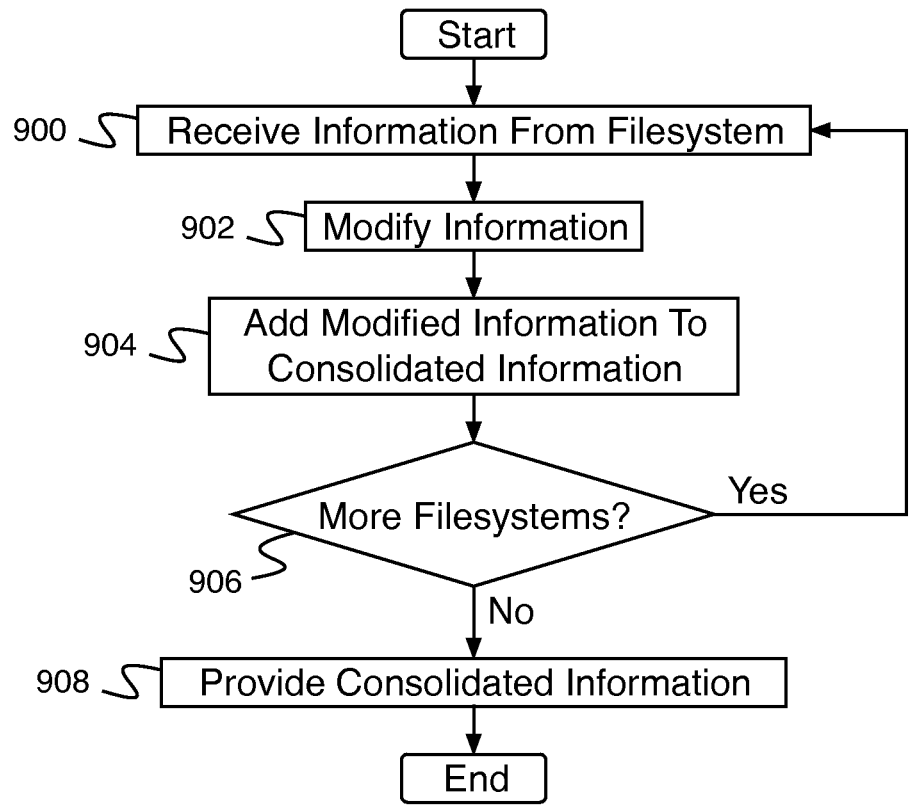
FIG. 9 is a flow diagram illustrating an example of an embodiment of a process for consolidating information.

FIG. 9 is a flow diagram illustrating an example of an embodiment of a process for consolidating information. In some embodiments, the process of FIG. 9 is executed by information consolidator 410 of FIG. 4. In some embodiments, the process of FIG. 9 consolidates the responses from a plurality of filesystems to a filesystem command output to each of the set of filesystems. In the example shown, in operation 900, information is received from a filesystem. In operation 902, the information is modified. In some embodiments, modifying the information comprises modifying a path associated with the information. In some embodiments, modifying the information comprises modifying data locations to allow a cluster gateway to act as a proxy for data read/write actions to remote cluster filesystems. In operation 904, the modified information is added to consolidated information. In operation 906, it is determined whether there are more filesystems. In some embodiments, it is determined whether there are more filesystems of the plurality of filesystems. In some embodiments, it is determined whether information is expected to be received from more filesystems of the plurality of filesystems. In the event it is determined that there are more filesystems, control passes to operation 900. In the event it is determined that there are not more filesystems, control passes to operation 908. In operation 908, consolidated information is provided (e.g., to a cluster via a cluster interface).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. In a cluster that includes a gateway, a plurality of computing devices connected to the gateway, and multiple filesystems having different filesystem formats connected to said gateway, a method of enabling said plurality of computing devices to interact with said multiple filesystems comprising:

receiving by said gateway a filesystem command from a computing device of the cluster;

determining by said gateway a set of target filesystems of said multiple different filesystems as being appropriate for receiving said filesystem command, said set of target filesystems comprising a subset of said multiple different filesystems and said set of target filesystems being determined to be appropriate based upon the physical proximity of said filesystems of said determined set to said computing device from which said filesystem command was received;

tailoring the received filesystem command to form separate commands tailored for the filesystem format for each of selected ones of the filesystems of the set of target filesystems determined to be appropriate to receive said filesystem command, said tailoring comprising changing said received filesystem command to match the filesystem format and modifying path information of said received filesystem command to be appropriate for said each selected one of said target filesystems determined to be appropriate to receive said filesystem command, wherein said tailoring the filesystem command comprises determining a path associated with the received filesystem command, parsing the path into a filesystem path pointing to each selected target filesystem and into a local path pointing to a file stored on said each selected target filesystem; and providing the separate tailored commands including filesystem paths and local paths to each of the selected filesystems to enable said computing device to access said file stored on said each selected filesystems.

2. A method as in claim 1, wherein the filesystem command comprises an action to be performed on said target filesystems.

3. A method as in claim 2, wherein the action comprises one of the following: a read action or a write action on a file associated with a target filesystem.

4. A method as in claim 2, wherein the action comprises one of the following: a move action, a copy action, or a delete action on data in a target filesystem.

5. A method as in claim 2, wherein the action comprises one of the following: a get info action or a list action on information in a target filesystem.

6. A method as in claim 2, wherein the action comprises a change permissions action or a list permissions action for actions on a file associated with a target filesystem.

7. A method as in claim 2, wherein the action comprises a directory creation action in one or more of said target filesystems.

8. A method as in claim 1, further comprising consolidating information received from the target filesystems of said set in response to said providing the tailored command to the target filesystems, and providing said consolidated information to said computing device.

9. A method as in claim 8, wherein the information received from the target filesystems is received from those target filesystems with which the tailored command interacts.

10. A method as in claim 1, further comprising receiving in response to said filesystem command a registration indication for each of said multiple filesystems from a filesystem registry.

11. A method as in claim 10, wherein said receiving comprises receiving an indication to add a new filesystem.

12. A method as in claim 10, wherein said receiving comprises receiving an indication to remove a registered filesystem.

13. A non-transitory computer readable storage medium for a cluster that includes a gateway, a plurality of computing devices connected to the gateway, and multiple filesystems having different filesystem formats connected to the gateway, the non-transitory computer readable storage medium embodying computer instructions for controlling operations of a processor to enable said plurality of computing devices to interact with said multiple filesystems for:

receiving by said gateway a filesystem command from a computing device of the cluster;

determining, by said gateway, a set of target filesystems of said multiple filesystems as being appropriate for receiving said filesystem command, said set of target filesystems comprising a subset of said multiple filesystems and being determined to be appropriate based upon the physical proximity of said filesystems of said determined set to said cluster computing device from which said filesystem command was received;

tailoring the received filesystem command to form separate commands tailored for the filesystem format for each of selected ones of the filesystems of the set of target filesystems determined to be appropriate to receive said filesystem command, said tailoring comprising changing said received filesystem command to match the filesystem format and modifying path information of said received filesystem command to be appropriate for said each selected one of said target filesystems determined to be appropriate to receive said filesystem command, wherein said tailoring the filesystem command comprises determining a path associated with the received filesystem command, parsing the path into a filesystem path pointing to each selected target filesystem and into a local path pointing to a file stored on said each selected target filesystem; and providing the separate tailored commands including filesystem paths and local paths to each of the selected filesystems to enable said computing device to said file stored on said each selected filesystems.

* * * * *